United States Patent Office 3,313,822
Patented Apr. 11, 1967

3,313,822
DIPHENYL SUBSTITUTED AMINOALKYL
PYRIDINES
Robert I. Meltzer, Rockaway, N.J., assignor to Warner-Lambert Pharmaceutical Company, Morris Plains, N.J., a corporation of Delaware
No Drawing. Filed July 14, 1965, Ser. No. 472,053
7 Claims. (Cl. 260—296)

This invention relates to diphenyl substituted alkylamino alkyl pyridines of the formula:

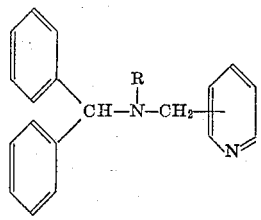

wherein R represents hydrogen or lower akyl of 1 to 6 carbon atoms such as methyl, ethyl, propyl, isopropyl, isobutyl and the like.

This invention also includes within its scope a novel process for the production of these compounds.

The compounds of this invention are effective in the treatment of peptic ulcer.

For use, the compounds of this invention are combined with an inert pharmaceutical carrier to form dosage forms such as tablets, capsules, suspensions, elixirs, thixotropic gels, suppositories, and the like with the active ingredient being present from 10 to 100 mg. per dosage unit. In addition, these compounds may also be combined, for example, with other known theraputic compounds. For example, antacids such as aluminum hydroxide, magnesium hydroxide and magnesium trisilicate, anti-cholinergic drugs such as atropine and hyoscamine, analgesics such as morphine, tranquilizers such as prazepam, chlordiazepoxide, diazepam, sedatives such as mecoqualone, steriods such as prednisolone, cortisone, and dexamethasone may be included to enhance and broaden their therapeutic spectrum.

According to the process of this invention, these compounds are prepared by reacting a pyridine aldehyde of the formula:

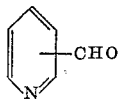

with a benzhydrylamine of the formula:

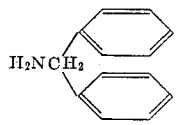

in a suitable solvent such as dry benzene at the reflux temperature of the solvent employed. This reaction results in the formation of an intermediate of the formula:

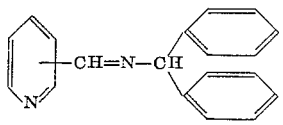

The intermediate obtained is then reduced with a suitable reducing agent such as a complex metal hydride, for example, sodium or potassium borohydride, to yield that compound of this invention in which R is hydrogen. In order to produce those compounds in which R is lower alkyl, it is then reacted with a suitable alkylating agent such as a mixture of formic acid and formaldehyde. Other suitable agents which may be used are, for example, alkyl halides, alkali metal carbonates or the reduction of a mixture of the secondary amines with aldehydes or ketones by hydrogen in the presence of noble metal catalysts and the like. The desired N-alkylated compounds may be recovered by standard procedure such as extraction with a suitable solvent.

The compounds of this invention may also be converted to the corresponding acid addition salts by reacting the free base with a suitable acid such as hydrochloric, nitric, sulfuric or phosphoric and the like in a suitable solvent and recovering the resulting acid addition salts by suitable crystallization techniques.

In order to further illustrate this invention, the following examples are given:

EXAMPLE 1

*2-[(diphenylmethyl)aminomethyl]pyridine*

To 11.1 g. of 2-pyridine aldehyde in 100 ml. of dry benzene is added 18.3 g. of benzhydrylamine. The reaction is maintained at reflux under a Dean-Stark trap until water ceases to be collected. Benzene is removed by distillation and replaced by petroleum ether and the product obtained is an intermediate of the formula:

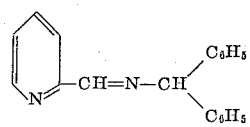

which forms white crystals which, after being recrystallized from isopropanol, melt at 105–107° C. To 20 g. of this intermediate in 150 ml. of methanol is added 2.8 g. of sodium borohydride. After stirring at 20 to 25° C. for ½ hour the reaction mixture is heated at reflux for an additional ½ hour. After cooling, 10 ml. of water is added and the volume is then reduced by distillation to half. Addition of 200 ml. of water causes precipitation of a white oil which solidifies on standing. Recrystallization of this oily material from isopropanol gives 15.5 g. of 2-[(diphenylmethyl)aminomethyl]pyridine melting at 69–71° C. Further purification by recrystallization from isopropanol raised the melting point to 75–76° C.

*Analysis.*—For $C_{19}H_{18}N_2$—Calcd.: C, 83.14; H, 6.61; N, 10.21. Found: C, 83.22; H, 6.49; N, 10.00.

EXAMPLE 2

*2-[(diphenylmethyl)methylaminomethyl]pyridine*

A solution of 10 g. of 2-[(diphenylmethyl)aminomethyl]-pyridine obtained in accordance with Example 1, 6.07 g. of 37% formaldehyde solution and 3.68 g. of 100% formic acid in 50 ml. of water and having a pH of less than 4 is maintained on a steam bath overnight. After 16 hours, the reaction mixture is cooled, the pH is adjusted to 10 with potassium hydroxide, and the reaction mixture is extracted with ether. The ethereal solution is dried over magnesium sulfate and concentrated to give a viscous oil. This material crystallizes to yield 2-[(diphenylmethyl)methylaminomethyl]pyridine melting at 50–65° C. Recrystallization from petroleum ether gives 8.3 g. of product melting at 56–58° C.

*Analysis.*—For $C_{20}H_{20}N_2$—Calcd: C, 83.29; H, 6.99; N, 9.72. Found: C, 83.34; H, 7.19; N, 9.94.

EXAMPLE 3

*3-[(diphenylmethyl)aminomethyl]pyridine*

This compound is prepared essentially similar to the method used for the preparation of 2-[(diphenylmethyl) aminomethyl]pyridine, as described in Example 1, but using 3-pyridine aldehyde. The product melts at 94–95° C.

*Analysis.*—For $C_{19}H_{18}N_2$—Calcd.: for C, 83.18; H, 6.61; N, 10.21. Found: C, 83.19; H, 6.56; N, 9.99.

EXAMPLE 4

*3-[(diphenylmethyl)methylaminomethyl]pyridine*

This compound is prepared from 3-[(diphenylmethyl)aminomethyl]pyridine, obtained in accordance with Example 3 by the method used to prepare 2-[(diphenylmethyl)methylaminomethyl]pyridine, as described in Example 2. This product, after being recrystallized from petroleum ether, melts at 69–71° C.

*Analysis.*—For $C_{20}H_{20}N_2$—Calcd.: C, 83.15; H, 7.12; N, 9.17. Found: C, 83.29; H, 6.99; N, 9.72.

EXAMPLE 5

*4-[(diphenylmethyl)methylaminomethyl]pyridine*

This 4-pyridyl derivative is prepared in an analogous fashion to the corresponding 2-pyridyl derivative, 2-[(-diphenylmethyl)methylaminomethyl]pyridine. In this case evaporation of the ether solution of the methylated compound from the formaldehydeformic acid treatment does not result in the crystallization of a free base. It is, therefore, dissolved in isopropanol and treated with hydrogen chloride followed by the addition of ether. This results in the precipitation of the monohydrochloride which melts at 238–239° C. after recrystallization from a methanol-ether mixture. Ths material is dissolved in water, made alkaline with potassium hydroxide and extracted with ether. The washed and dried ether extract is concentrated to dryness to yield 4-[(diphenylmethyl)methylaminomethyl]pyridine as a white solid which, after recrystallization from aqueous isopropanol melts at 135–137° C.

*Analysis.*—For $C_{20}H_{20}N_2$—Calcd.: C, 83.29; H, 6.99; N, 9.72. Found: C, 83.11; H, 7.18; N, 9.52.

It is understood that the foregoing detailed description is given merely by way of illustration and that many variations may be made therein without departing from the spirit of my invention.

Having described my invention what I desire to secure by Letters Patent is:

1. A compound selected from the group consisting of the free base of the formula:

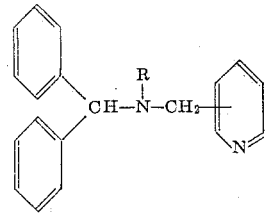

wherein R is a member of the group consisting of hydrogen or lower alkyl and the acid addition salts thereof.

2. 2-[(diphenylmethyl)methylaminomethyl]pyridine.
3. 3-[(diphenylmethyl)methylaminomethyl]pyridine.
4. 4-[(diphenylmethyl)methylaminomethyl]pyridine.
5. 2-[(diphenylmethyl)aminomethyl]pyridine.
6. 3-[(diphenylmethyl)aminomethyl]pyridine.
7. 4-[(diphenylmethyl)aminomethyl]pyridine.

References Cited by the Examiner

UNITED STATES PATENTS

| | | | |
|---|---|---|---|
| 2,540,946 | 2/1951 | Hoffman et al. | 260—240 |
| 2,797,224 | 6/1957 | Offe | 260—296 |
| 2,965,646 | 12/1960 | Gardner et al. | 260—296 |

JOHN D. RANDOLPH, *Primary Examiner.*